United States Patent
Houlihan (10) Patent No.: US 10,463,977 B1
(45) Date of Patent: Nov. 5, 2019

(54) GAMER THUMB GLOVE FOR IMPROVED VIDEO GAME PLAY

(71) Applicant: Patrick Richard Houlihan, Fresno, CA (US)

(72) Inventor: Patrick Richard Houlihan, Fresno, CA (US)

(\*) Notice: Subject to any disclaimer, the term of this patent is extended or adjusted under 35 U.S.C. 154(b) by 0 days.

(21) Appl. No.: 14/591,910

(22) Filed: Jan. 7, 2015

Related U.S. Application Data (60) Provisional application No. 61/924,690, filed on Jan. 7, 2014.

(51) Int. Cl.
*A63F 13/98* (2014.01)
*A63F 13/24* (2014.01)

(52) U.S. Cl.
CPC .............. *A63F 13/98* (2014.09); *A63F 13/24* (2014.09)

(58) Field of Classification Search
None
See application file for complete search history.

(56) References Cited

U.S. PATENT DOCUMENTS

| | | | |
|---|---|---|---|
| D329,144 S | 9/1992 | Kurtz | |
| 5,764,164 A * | 6/1998 | Cartabiano | A63F 13/06 341/22 |
| 5,883,690 A * | 3/1999 | Meyers | A63F 13/02 345/161 |
| 6,338,485 B1 | 1/2002 | Huettlinger | |
| 6,459,420 B1 * | 10/2002 | Harris | A63F 13/06 345/161 |
| D469,436 S | 1/2003 | Hussaini et al. | |
| D469,766 S | 2/2003 | Hussanini et al. | |
| 6,557,853 B2 | 5/2003 | Huettlinger | |
| D610,144 S | 2/2010 | Claussen | |
| 7,993,203 B1 | 8/2011 | Walker, II et al. | |
| 2002/0060425 A1 * | 5/2002 | Huettlinger | A63F 13/02 273/148 R |
| 2005/0215321 A1 | 9/2005 | Hussaini et al. | |
| 2015/0157949 A1 * | 6/2015 | Durling, Jr. | A63F 13/98 463/47 |

\* cited by examiner

*Primary Examiner* — Jason T Yen
(74) *Attorney, Agent, or Firm* — Richard A. Ryan (57) ABSTRACT

A thumb glove for use by a video game player to improve the quality of his or her game play by securing the thumb of the player to an upward extending thumbstick of a hand-held video game controller. The thumb glove has a tubular sleeve defining a thumb cavity that receives the player's thumb and an attachment mechanism that securely attaches the tubular sleeve to the thumbstick. The tubular sleeve can have a knuckle opening in a top wall thereof to receive the knuckle of the thumb and one or more vent slots in the side walls thereof to allow air to flow through the thumb cavity and cool the thumb. The attachment mechanism can comprise a base and a plurality of engaging members that tightly grasp the thumbstick or it can comprise a tubular member that receives and engages a portion of the thumbstick inside the tubular member.

20 Claims, 8 Drawing Sheets

FIG. 14

GAMER THUMB GLOVE FOR IMPROVED VIDEO GAME PLAY

CROSS-REFERENCE TO RELATED APPLICATIONS

This patent application claims priority to U.S. Provisional Application Ser. No. 61/924,690 filed Jan. 7, 2014.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to video game systems and to the video game controllers that are utilized therewith. In particular, the present invention relates to devices that facilitate improved use of the video game controller to better control the movement and/or other action of an object displayed on a screen by the video game system. Even more particularly, the present invention relates to such devices that improve the user's control of the joystick, thumbstick or like user control component of the video game controller by securing the user's thumb to the user control component so as to improve game performance and the user's enjoyment of the video game.

B. Background

Many people enjoy playing video games comprising one or more objects that are displayed on a video screen, such as a television, computer monitor, built-in screen or the like. The objects may be a person, person-like character, animals, vehicles, aliens, dinosaurs and a wide range of other objects that are capable of moving and/or performing other action, including operating weapons, vehicles and the like, that enhance the user's gaming experience. All such video games require some type of control system. The most common video control systems comprise a game console that internally houses the computer control components and a video game controller that operatively connects, either by a wire or wirelessly, to the game console to allow the user to operate the system and control the movement and other actions of the objects that are displayed by the game controller on the screen. Game systems are configured for the user to play or compete against the video game system itself and other persons who are in the same location (such as a living room or bedroom) and who have a video game controller that is operatively connected to the same game console. Most games systems are also configured to allow the user to play with and compete against persons who are remotely located, often very remotely (such as a different state or country), from the user via a connection to the Internet.

As well known in the art, the video game controller is generally sized and configured to be comfortably held in the user's hand and to allow the user to control the movement and other action of one or more objects that are displayed on the video screen by the game console. The typical video game controller has a plurality of buttons and/or other components that are manipulated by the user to actively control one or more objects that are displayed on the video screen. These components are generally positioned on the video game controller so as to allow the user to use his or her thumbs and fingers to operate the components and, as a result, control the movement and/or action of the objects on the video screen.

One of the control components of the video game controllers used to control objects is commonly referred to as a thumbstick. The thumbstick, which is controlled by the user's thumb, is one of the main control components of the video game controller. Although thumbsticks may be configured differently on different manufacturer's video game controllers, one of the most common configurations comprises a post and a generally round button-like top member at the upper end of the post. The top member has a concave upper surface against which the user's thumb applies pressure to the thumbstick to move or otherwise control the action of one or more objects of the video game. This type of thumbstick is utilized with video game controllers configured for Xbox and Playstation video game systems. As will be readily understood by those skilled in the art, the user generally must continually keep his or her thumb on the upper surface of the thumbstick and apply a generally downward pressure against the thumbstick as he or she moves the thumbstick left, right, forward, backward and/or at angles to control the object displayed on the video screen.

As well known by those who play video games, rapid movement of the thumbstick by the user, which movement is often desired and beneficial for the game play, can result in the user's thumb slipping or otherwise moving off of the thumbstick. As also well known, perspiration increases the likelihood of this problem. In the middle of game play, this loss of thumb contact with the thumbstick results in loss of user control over the object on the video screen. This loss of control can cause undesirable movement or other action or cause non-movement (i.e., "freezing") of the object. Generally, the loss of control can be very detrimental to the user's desired game play, such as resulting in his or her character being killed or otherwise incapacitated by the game and/or another character in the video game. In addition to loss of control, another problem with use of the thumbstick that is common among those who play video games is that the muscles of the thumb can become sore and the joints thereof become stressed, which can lead to repetitive stress-type injuries in those who frequently play video games.

To combat the problems of loss of control, soreness and joint stress associated with use of a joystick or thumbstick on a video game controller, several devices have been developed to address these problems. One such prior art device are the strap-like devices described in U.S. Pat. Nos. 6,338, 485 and 6,557,853, both to Huettlinger. These devices comprise an elongated strap-like member that is securely joined to the top member of the joystick and then wrapped around and secured over the user's thumb so as to attach the user's thumb to the joystick. U.S. Pat. No. 6,459,420 to Harris describes a joystick design or attachment therefore that comprises a sleeve sized and configured to receive the end of the user's thumb that is integral with or attaches to the top of joystick. The attachment version of this device comprises a hole at the bottom of the sleeve which is sized and configured to fit over the top member of the joystick. U.S. Pat. No. 7,993,203 to Walker, II, et al. describes a thumbstick adapter having a base with two raised control elements at its upper surface disposed in a generally U-shaped or saddle-like configuration to receive the user's thumb and an attachment device at its lower surface to secure the adapter to the top of the thumbstick. During use, the user's thumb rests between the two control elements to allow the user to move the thumbstick. The attachment device comprises a plurality of downward projecting legs that each have an inwardly projecting attachment element configured to engage the bottom surface of the top of the thumbstick to snap the device onto the thumbstick.

Despite the foregoing prior art, what is needed is an improved device for use with the thumbstick of a video game controller that is configured to allow the user to more securely and comfortably operate the thumbstick and, thereby, more effectively control the applicable objects of a video game. Preferably, the improved thumbstick control device should be configured to secure the user's thumb to the thumbstick to prevent the thumb from inadvertently slipping off of the thumbstick during video game play. In addition, the improved thumbstick control device should be sized and configured to comfortably engage the user's thumb and to reduce the soreness and stress to the thumb that results from the requirement to have direct contact between the user's thumb and the thumbstick of the video game controller. Preferably, an improved thumbstick control device should also be configured to achieve the above benefits while allowing the user to maintain the feel of his or her thumb being against the top of a thumbstick. The improved thumbstick control device should be configured to be comfortable to wear, even for relatively long periods of time, and be relatively inexpensive to manufacture.

SUMMARY OF THE INVENTION

The gamer thumb glove for improved video game play of the present invention provides the benefits and solves the problems identified above. That is to say, the present invention is directed to a thumb glove for use with the thumbstick of a video game controller to allow the user to more securely and comfortably operate the thumbstick and, thereby, more effectively control the applicable objects of the video game. The thumb glove of the present invention secures the user's thumb to the top of the thumbstick in a manner that prevents the thumb from inadvertently slipping off of the thumbstick during video game play, including the fast action play which is common for many video games. The thumb glove of the present invention comprises a thumb sleeve that is sized and configured to comfortably receive the user's thumb so as to reduce the soreness and stress to the thumb that commonly results from direct contact between the user's thumb and the thumbstick. The thumb glove of the present invention has an attachment mechanism that secures the sleeve to the top of the thumbstick. In one embodiment of the thumb glove of the present invention, the attachment mechanism is configured to removably snap onto the top of the thumbstick. In another embodiment of the thumb glove of the present invention, the attachment mechanism is configured to removably stretch and retract so as to at least substantially envelope the thumbstick. In yet another embodiment of the thumb glove of the present invention, the entire thumb glove is made out of an elastic material. In any configuration, the thumb glove is configured to be comfortable for the user to wear for relatively long periods of time while he or she is playing the video game. In a preferred configuration, the thumb glove of the present invention is configured such that the user is able to maintain the feeling associated with his or her thumb being pressed against the top of a thumbstick. In the preferred configurations, the improved thumbstick control device of the present invention is relatively inexpensive to manufacture.

In the preferred embodiments of the present invention, the game thumb glove generally comprises an elongated tubular sleeve which receives the user's thumb and an attachment mechanism attached to or integral with the tubular sleeve that secures the tubular sleeve to the thumbstick of a video game controller. The tubular sleeve has a sleeve body with a first end and second end, a plurality of walls, namely a top wall, bottom wall, first side wall and second side wall, that define a thumb cavity inside the sleeve body. The second end of the sleeve body is generally open to removably receive the user's thumb inside the thumb cavity, which is sized and configured to receive at least a distal end and a knuckle of the user's thumb when the user uses the thumb glove to operate the thumbstick of the video game controller. The attachment mechanism is structured and arranged so as to maintain the thumb of the user in operative engagement with the thumbstick, even during periods of rapid and/or aggressive game play and/or when the user's thumb is sweaty, to allow the user to be able to properly operate the video game controller. In a preferred embodiment, the sleeve body is sized and configured to substantially extend from the distal end of the thumb to at or near a proximal end of the thumb when the thumb of the user is disposed inside the thumb cavity of the tubular sleeve. Preferably, the thumb glove has vent slots in one or more walls of the sleeve body, such as the two side walls. The vent slots are positioned, sized and configured to allow air to pass into the thumb cavity when the user is using the thumb glove to operate the video game controller to keep the user comfortable and reduce the likelihood of the user's thumb sweating during periods of extended game play. The preferred thumb glove also has a knuckle opening in the top wall of the sleeve body, with the knuckle opening being sized and configured to receive the knuckle of the thumb of the user when the thumb of the user is disposed in the thumb cavity of the tubular sleeve.

In a preferred embodiment, the attachment mechanism is attached to or integral with the bottom wall of the sleeve body and configured to extend generally downward from the sleeve body to engage the thumbstick of the video game controller when the tubular sleeve is attached to the thumbstick. In one embodiment, the attachment mechanism comprises a base having two or more downwardly extending engaging members that are structured and arranged to engage a top member of the thumbstick so as to securely attach the thumb glove to the thumbstick. Preferably, the engaging members are sized and configured to tightly engage an edge of the top member of the thumbstick to securely attach the thumb glove to the thumbstick. The engaging members can each have an inwardly directed attachment element that is sized and configured to engage a lower surface of the top member of the thumbstick, below the edge of the top member, to securely attach the thumb glove to the thumbstick. In another embodiment, the attachment mechanism comprises a tubular member that is attached to or integral with the bottom wall of the sleeve body. In this embodiment, the tubular member has an opening that is size and configured to receive the top member of the thumbstick into the tubular member so an interior wall of the tubular member will tightly engage the edge of the top member to secure the thumb glove to the thumbstick. In a preferred configuration of this embodiment, the tubular member is integral with the sleeve body and both the tubular sleeve and the attachment mechanism are made out of a pliable material, with the tubular member being sized and configured to tightly grip the top member of the thumbstick.

In a preferred configuration of the present invention, the thumb glove also comprises a contact member having an upper surface that is disposed in the thumb cavity of the tubular sleeve. The contact member is positioned so a bottom surface of the user's thumb will be in contact with the upper surface of the contact member when the user utilizes the thumb glove to operate the thumbstick of the video game controller. In one embodiment, the upper surface of the contact member is sized and configured to at least substantially correspond in shape and size to an upper surface of the top member of the thumbstick so the user will still have the feel of direct contact with the thumbstick. If desired, the contact member can be attached to, integral with or otherwise associated with the attachment mechanism such that the contact member extends upward from a base of the attachment mechanism through a connector opening in the bottom wall of the sleeve body so as to attach the base, and therefore the attachment mechanism, to the tubular sleeve. In this manner, the attachment mechanism can be removably attached to the tubular sleeve to allow the user to replace the attachment mechanism for different types of video game controllers.

Accordingly, the primary objective of the present invention is to provide an improved thumbstick control device for use with the thumbstick of a video game controller that has the various advantages discussed above and elsewhere in this disclosure and which is able to overcome the various disadvantages and limitations associated with the prior art devices that are configured to control the thumbstick of a video game controller.

An important aspect of the present invention is that it provides a thumb glove which receives the thumb of a user so as to secure the user's thumb to the thumbstick of a video game controller to allow him or her to better operate the thumbstick, even during rapid game play and/or when the thumb is sweaty, thereby allowing him or her to better control the movement and/or other action of one or more objects in a video game.

Another important aspect of the present invention is that it provides a thumb glove which comfortably receives the thumb of a user who is playing a video game with a video game controller having an upward extending thumbstick that controls the movement and/or action of an object in the video game in a manner that allows the user to maintain contact with the thumbstick even when he or she is rapidly operating the thumbstick and/or his or her thumb is sweaty.

Another important aspect of the present invention is that it provides a thumb glove comprising a tubular sleeve which substantially receives the thumb of a user in a thumb cavity that is defined by the tubular sleeve and an attachment mechanism that is attached to or integral with the tubular sleeve and configured to securely attach to the upward extending thumbstick of a video game controller to allow the user to better control the operation of the thumbstick.

Another important aspect of the present invention is that it provides a thumb glove comprising a tubular sleeve which substantially receives the thumb of a user to better control the thumbstick of a video game controller, with the thumb glove being configured to allow the user to maintain his or her feel of the thumbstick while he or she is using the thumb glove to operate the video game controller.

Another important aspect of the present invention is that it provides a thumb glove having an attachment mechanism which securely, but removably, attaches the thumb of a user to the thumbstick of a video game controller so as to allow the user to maintain control of the thumbstick during rapid game play and/or when his or her thumb is sweaty.

Another important aspect of one embodiment of the present invention is that it provides a thumb glove having an attachment mechanism which is made from an elastic material and is configured to at least substantially stretch around and then retract to envelope the thumbstick of a video game controller to attach the thumb glove to the thumbstick.

Another important aspect of the present invention is that it provides a thumb glove comprising a tubular sleeve which substantially receives the thumb of a user and an attachment mechanism to secure the tubular sleeve to a thumbstick of a video game controller, with both the tubular sleeve and attachment mechanism manufactured of an elastic material.

Yet another important aspect of the preferred embodiments of the present invention is that provides a thumb glove for improved video game play which is relatively inexpensive to manufacture.

The present invention achieves the objectives set forth above and elsewhere herein. The various aspects of the present invention that are described above are explained in greater detail by reference to the attached figures and to the description of the preferred embodiments which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are generally illustrative of a preferred embodiment of the present invention and are included to represent at least one way of configuring the present invention. Although specific components, materials, configurations and uses are described and/or illustrated, it should be understood that a number of variations to the components and to the configuration of those components described herein and shown in the figures can be made without changing the scope and function of the invention set forth herein. For instance, although the description and figures included herewith generally describe and show a particular configuration for the thumbstick of the video game controller and the tubular sleeve and attachment mechanism components of the thumb glove of the present invention, these are only shown for exemplary purposes in order to better explain the present invention. Persons skilled in the relevant art will readily appreciate that the present invention is not limited to the configuration of the various components shown or described herein.

Figure 1:
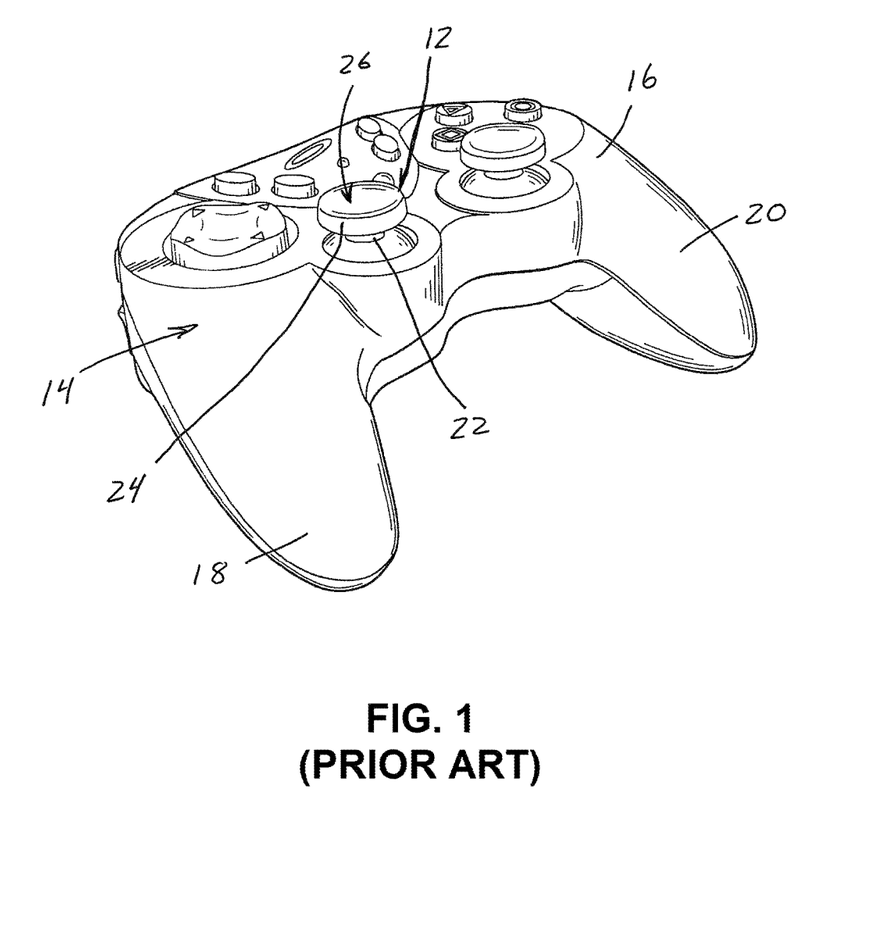
FIG. 1 is a top perspective view of a prior art video game controller having a thumbstick with which the thumb glove of the present invention can be utilized.
Figure 2:
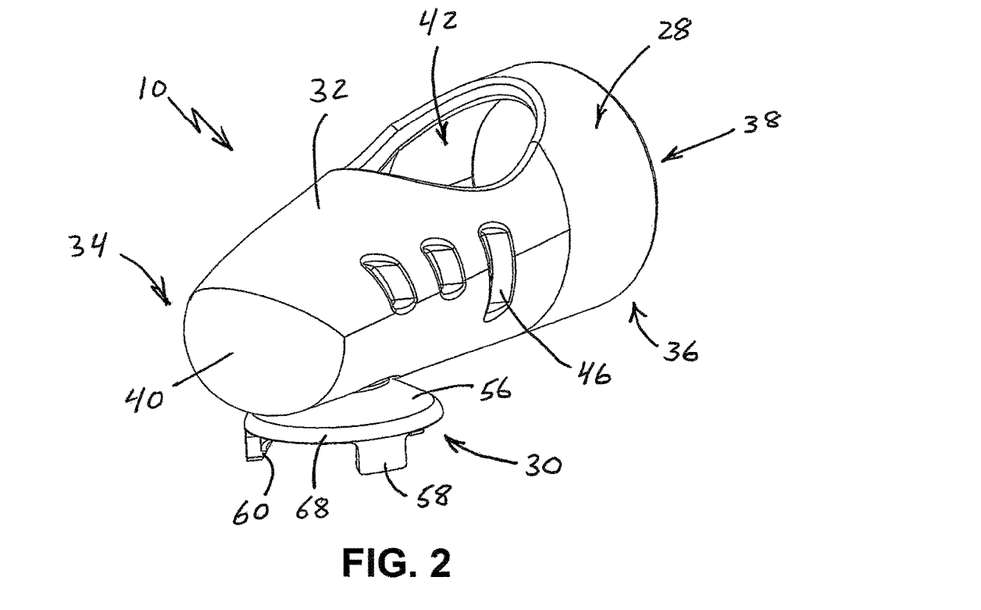
FIG. 2 is a front side perspective view of a thumb glove that is configured according to a first embodiment of the present invention having an attachment mechanism that snaps onto the thumbstick of the prior art video game controller of FIG. 1.
Figure 3:
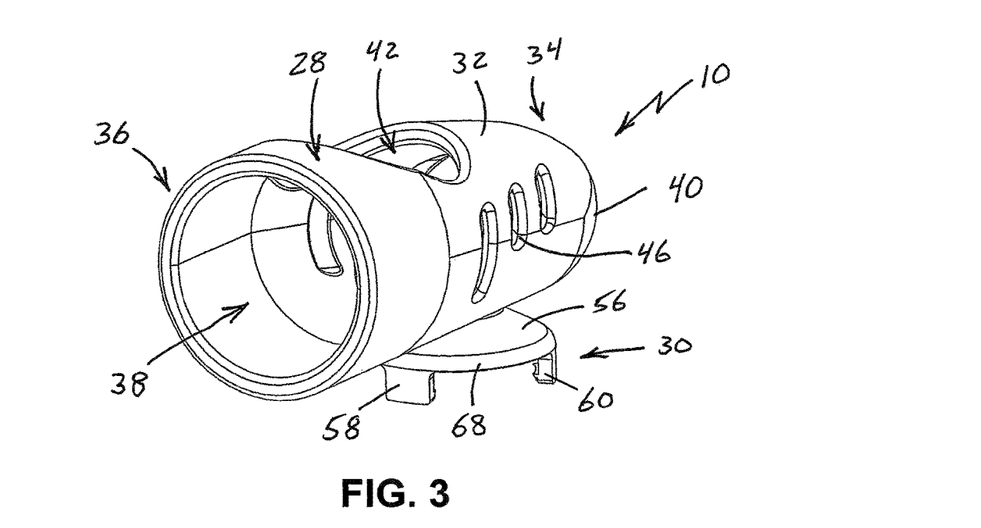
FIG. 3 is a back perspective view of the thumb glove of FIG. 2.
Figure 4:
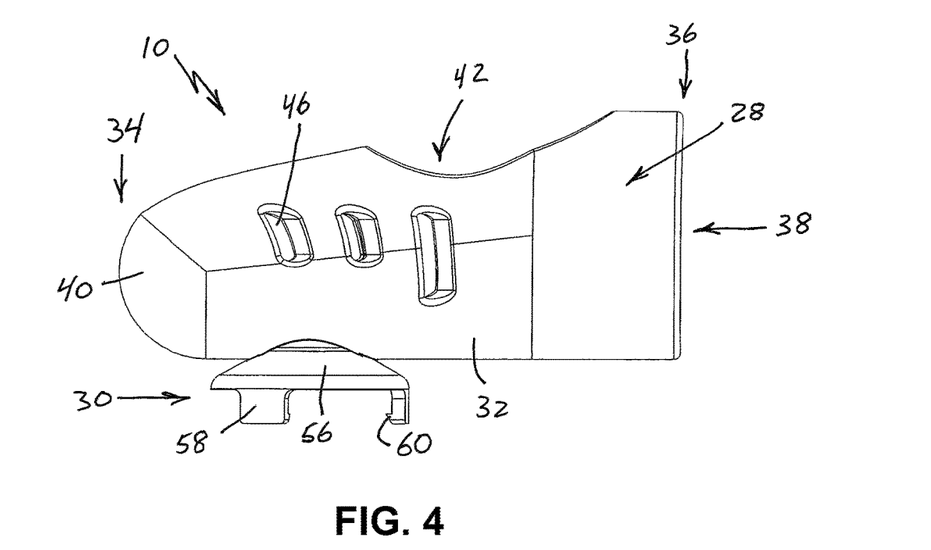
FIG. 4 is a left side view of the thumb glove of FIG. 2.
Figure 5:
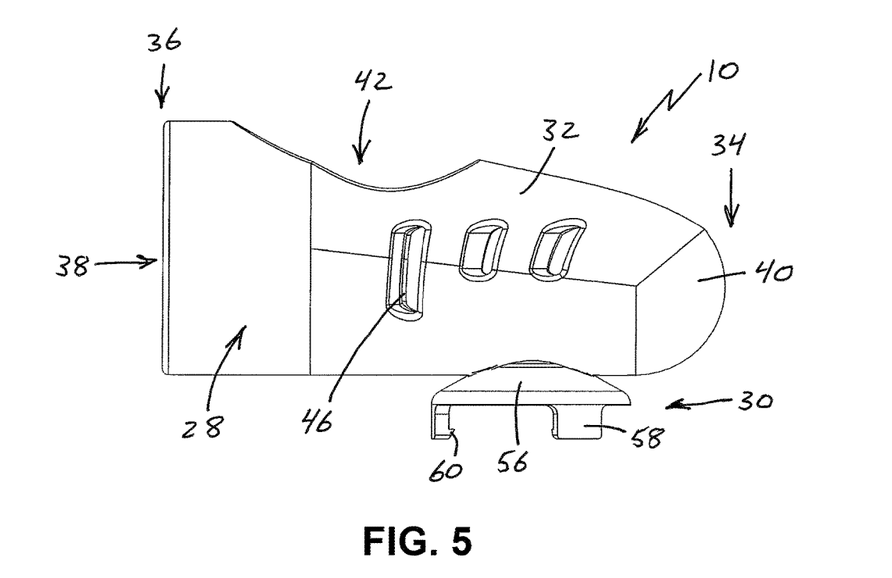
FIG. 5 is a right side view of the thumb glove of FIG. 2.
Figure 6:
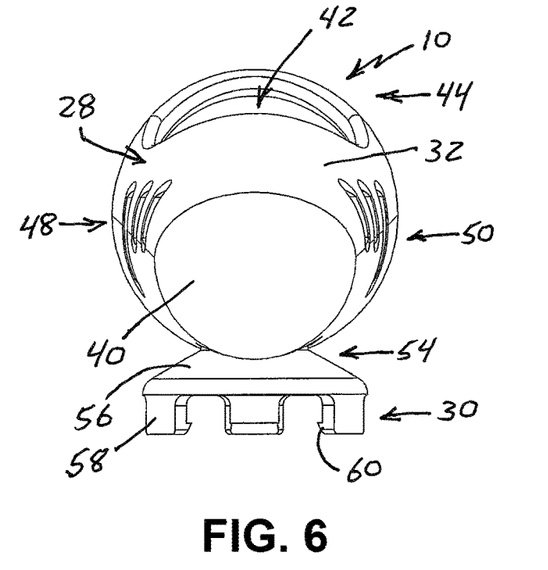
FIG. 6 is a front view of the thumb glove of FIG. 2.
Figure 7:
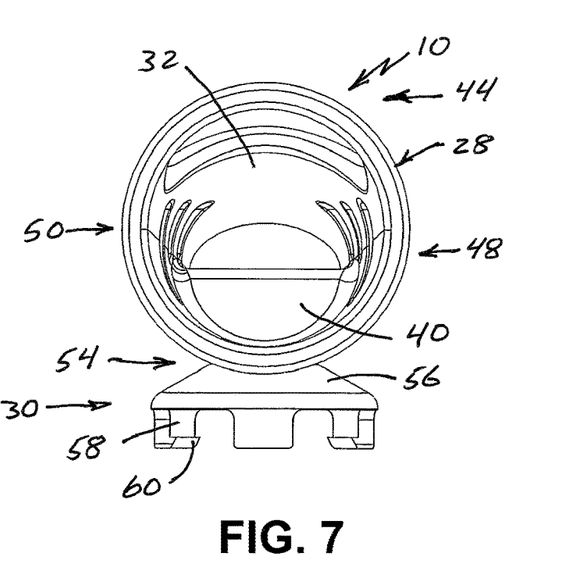
FIG. 7 is a back view of the thumb glove of FIG. 2.
Figure 8:
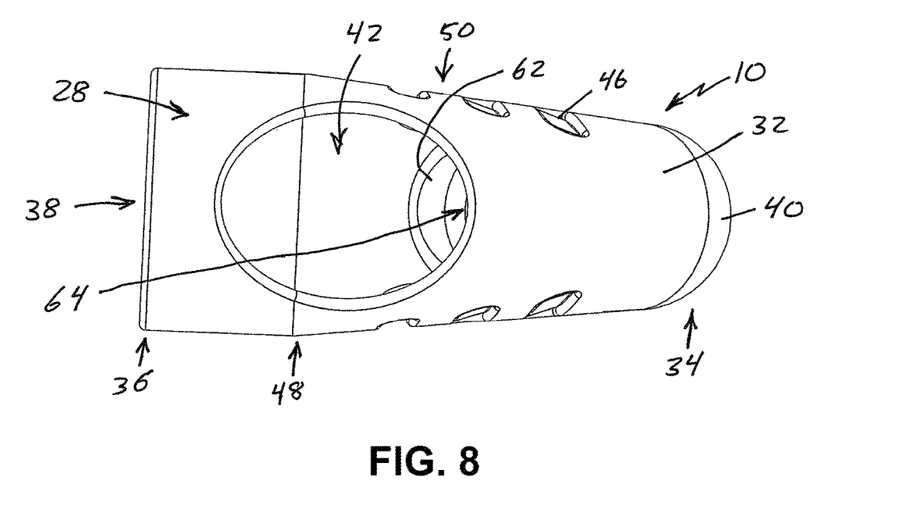
FIG. 8 is a top view of the thumb glove of FIG. 2.
Figure 9:
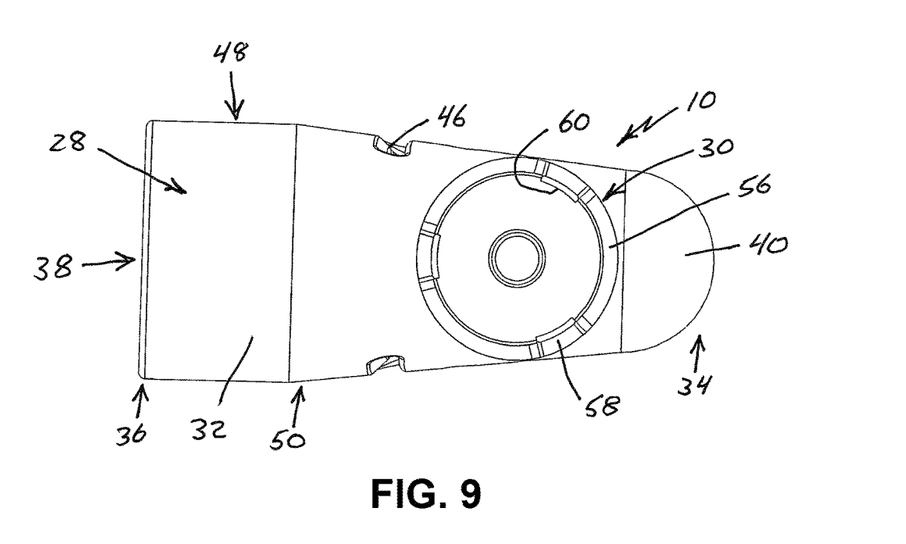
FIG. 9 is a bottom view of the thumb glove of FIG. 2.
Figure 10:
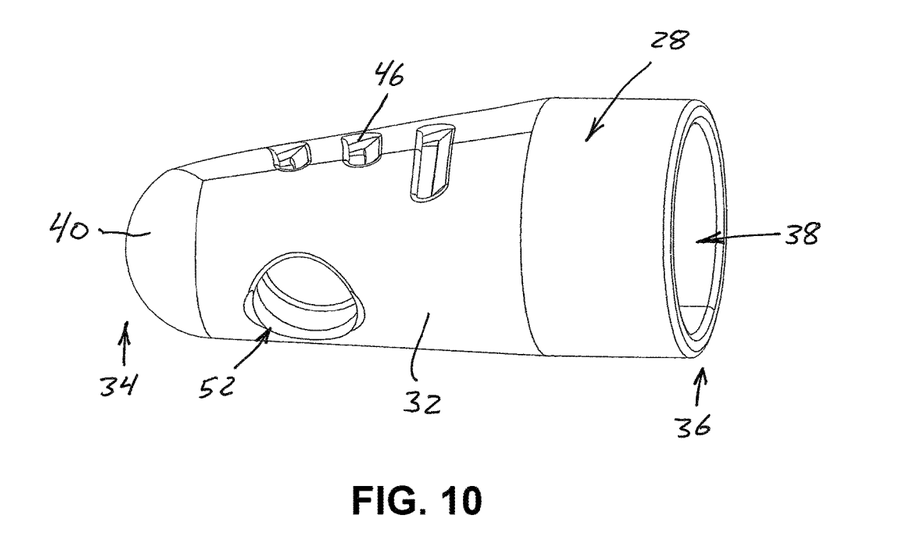
FIG. 10 is a side perspective view of the tubular sleeve of the thumb glove of FIG. 2.
Figure 12:
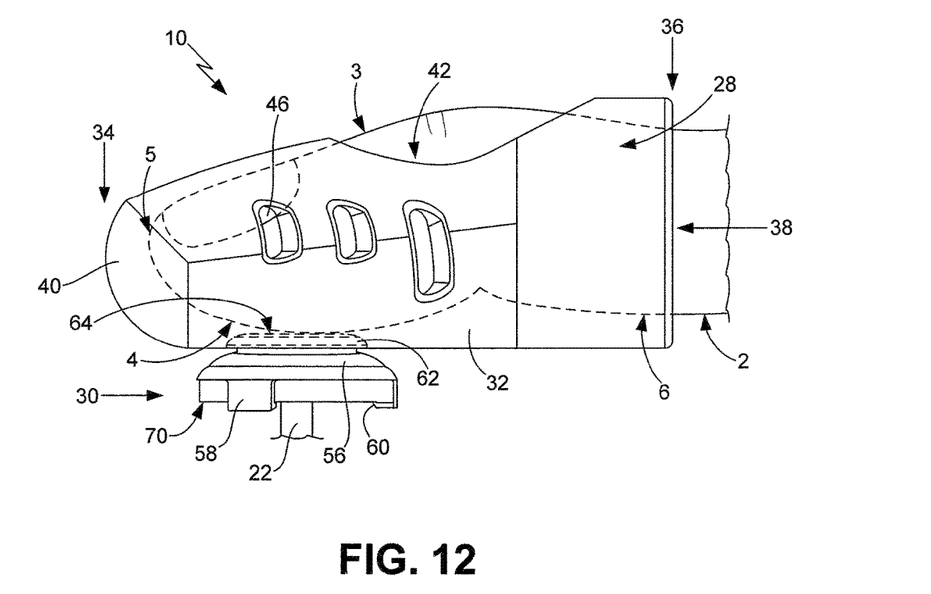
FIG. 12 is a right side view of the thumb glove of FIG. 2 shown being worn on the thumb of the user thereof.

A thumb glove that is configured pursuant to one of the preferred embodiments of the present invention is shown generally as 10 in FIGS. 2-9 and 12-14. As set forth in more detail below, the thumb glove 10 of the present invention is sized and configured to be worn by a user 2 to receive his or her thumb 3, as shown in FIG. 12, and engage the upwardly extending thumbstick 12 of a video game controller 14, an example of which is shown in FIG. 1, being utilized by the user 2 to play a video game or the like. As will be readily recognized by those skilled in the art, the prior art video game controller 14 is of the Xbox or Playstation, or equivalent, type of controller that is commonly utilized with certain video game systems. This type of video game controller typically has a controller body 16 that is shaped and configured to define a pair of hand grips 18/20 that are gripped by the user's hands during use of the video game controller 14. In one configuration, the video game controller 14 attaches to its associated game console (not shown) via one or more wires (also not shown). Alternatively, the video game controller 14 may wirelessly connect to the game console. The thumbstick 12 generally has an upwardly projecting post 22 that moveably interacts with components inside the controller body 16 and a generally round shaped top member 24 that is attached to or integral with the upper end of the post 22. The top member 24 generally has a concave upper surface 26. As well known in the art, during use of the video game controller 14 the bottom surface 4 (shown in FIG. 12) of the user's thumb 3 rests against the upper surface 26 of the top member 24 and applies pressure to the top member 24 so he or she can move the thumbstick 12 in the direction necessary to accomplish the movement or other action desired by the user 2 for one or more objects that are displayed on a video screen (not shown) connected to or otherwise associated with the game console.

As set forth in the Background above, during game play the user's thumb 3 may slip off of the upper surface 26 of top member 24 of the thumbstick 12 due to the user quickly moving the thumbstick 12 around, particularly during rapid game play, or due to perspiration reducing the surface contact between the thumb and top member 24 of the thumbstick 12. As also set forth above, frequent video game play can result in soreness or even repetitive-type injuries to the user's thumb 3. The thumb glove 10 of the present invention solves these problems and reduces the likelihood of soreness and injury to the thumb 3. In general, the thumb glove 10 of the present invention comprises a generally tubular sleeve 28 that is sized and configured to removably receive substantially the user's entire thumb 3 and an attachment mechanism 30 that is configured to secure the thumb glove 10 to the thumbstick 12, as best shown in FIG. 12. As set forth in more detail below, the thumb glove 10 of the present invention can be configured to be removably attached to the thumbstick 12 or it can be made as an integral part of thumbstick 12 and video game controller 14.

The tubular sleeve 28 comprises an elongated sleeve body 32 having a first or front end 34 and a second or back end 36 that defines a thumb cavity 38 that, in a preferred embodiment, has front wall 40 at least substantially closing the first end 34 of the sleeve body, as shown in FIGS. 2-14. As best shown in FIGS. 3, 7, 10 and 12, the second end 34 of the sleeve body 32 is configured to allow the user to put his or her thumb 3 inside the thumb cavity 38 through the open second end 34 of the sleeve body 32. The sleeve body 32 is sized and configured for the user's thumb to comfortably fit inside the thumb cavity 38 through the open second end 34 of the sleeve body 32. In the preferred embodiment, the length of sleeve body 32 (i.e., as measured between the first end 34 and the second end 36 and best shown in FIGS. 4 and 5) is sufficient to enclose substantially the entire thumb 3 of the user 2 inside the thumb cavity 38 with the forward or distal end 5 of the thumb 3 being at or near the front wall 40 and the rearward or proximal end 6 of the thumb 3 at or near the second end 36 of the sleeve body 32 (with the terms distal and proximal being utilized in reference to the user's hand or wrist) so as to provide support to the user's thumb 3. As will be readily appreciated by those skilled in the art, this length will further (relative to certain prior art devices) reduce the likelihood that the thumb 3 will inadvertently slip out of the thumb glove 10 and/or that the thumb 3 will become sore or injured from frequent video game playing. As will also be appreciated by persons skilled in the art, the support provided by the longer length of the tubular sleeve 28 of the thumb glove 10 of the present invention will be much easier on the user's wrist. In addition, because the longer length of the tubular sleeve 28 more securely attaches the thumb glove 10 to the user's thumb 3, the user 2 will not have to work as hard, or even really have to think about it at all, to ensure that his or her thumb 3 remains inside the thumb cavity 38 of the tubular sleeve 28.

In one embodiment of the thumb glove 10 of the present invention, the sleeve body 32 of the tubular sleeve 28 has solid walls along the entire length of the sleeve body 32. In a preferred embodiment, however, the sleeve body 32 has several openings which provide benefits for the user of the thumb glove 10. For instance, in the embodiment shown in FIGS. 2-10, the tubular sleeve 28 has a knuckle opening 42 at the top wall 44 of the sleeve body 32, as best shown in FIGS. 2-5 and 8, that is sized and configured to allow the user's thumb knuckle 7 to comfortably fit in the sleeve body 32 so as to reduce the strain and stress on the user's thumb 3. The embodiment of thumb glove 10 of the present invention shown in FIGS. 2-10 also comprises one or more vent slots 46 along one or more of the walls of the sleeve body 32. In a preferred embodiment, there are a plurality of vent slots 46 along each of the right or first side wall 48 and the opposing left or second side wall 50 of the sleeve body 32. The vent slots 46 generally allow air to pass through thumb cavity 38 so as to cool the user's thumb 3 and make wearing the thumb glove 10 more comfortable for the user 2 and reduce perspiration inside thumb cavity 38. In a first embodiment of thumb glove 10 of the present invention, shown in FIGS. 2-12, the sleeve body 32 of thumb glove 10 also has a connector opening 52 in the bottom wall 54 that is sized and configured, as set forth in more detail below, to receive a portion of an attachment mechanism 30. In a second embodiment of the thumb glove 10, shown in FIGS. 13-14, the bottom wall 54 of the sleeve body 32 is solid.

Figure 11:
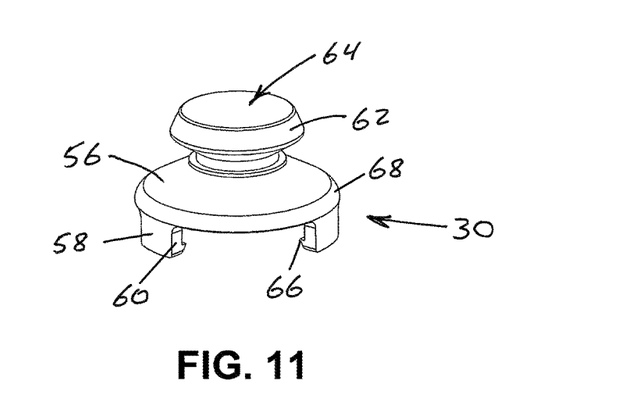
FIG. 11 is a side perspective view of the attachment mechanism of the thumb glove of FIG. 2.

In the first embodiment of the thumb glove 10 of the present invention, shown in FIGS. 2-12, the attachment mechanism 30 of thumb glove 10 generally comprises a base 56 at the bottom side 54 of the sleeve body 32, a plurality of engaging members 58 extending downward (when thumb glove 10 is being worn by the user 2, as shown in FIG. 12) from the base 56, an attachment element 60 at or near the bottom of each engaging member 58 extending inwardly from the engaging members 58 and a contact member 62 that extends upward from the base 56, as best shown in FIGS. 2-7 and 9-10 and 12. The contact member 62 has an upper surface 64 (as best shown in FIGS. 8 and 11) that is sized and configured, in a preferred embodiment, to be in at least substantially corresponding relation with the upper surface 26 of the thumbstick 12 of the video game controller 14. In the embodiment shown in the figures, the upper surface 64 of the contact member 62 at least substantially corresponds to the upper surface 26 of the top member 24, namely the contact member 62 is substantially the same diameter as the top member 24 of the thumbstick 12 and the upper surface 64 of the contact member 62 is similarly concavely shaped with the upper surface 26 of top member 24 so the bottom surface 4 of the user's thumb 3 will have the same familiar feeling as if the thumb 3 were being pressed against the upper surface 26 of the top member 24 of thumbstick 12. Alternatively, the upper surface 64 can have any desired configuration, such as having the rounded or mushroom top shape that it typically utilized with certain types of video game controllers (such as Nintendo 64 controllers) as may be desired by the user 2 of the thumb glove 10 of the present invention. In the embodiment shown in FIGS. 2-12, contact member 62 extends through the connector opening 52 at the bottom side 54 of the sleeve body 32 so that it is inside the thumb cavity 38. In use, the user's thumb 3 will be against the upper surface 64 of the contact member 62 and the interior sidewalls 66 of the engaging members 58 will be abutting the edge or edges 68 of the top member 24 of thumbstick 12 with the attachment elements 60 extending below the edges 68 of the top member 24 to engage the lower surface 70 of the top member 24, as shown in FIG. 12. Preferably, the engaging members 58 are structured and arranged around the base 56 to be able to fully engage the top member 24 of the thumbstick 12.

As set forth above, the engaging members 58 are structured and arranged to extend along at least a portion of the edge 68 of top member 24 of the thumbstick 12 and the attachment elements 60 extend inward sufficiently so as to abut and engage the lower surface 70 of the top member 24 and secure the attachment mechanism 30 to the thumbstick 12. To attach the thumb glove 10 to the thumbstick 12, the user 2 merely presses the attachment mechanism 30 down onto the top member 24 of the thumbstick 12. The engaging members 58 will flex slightly outward to allow the attachment elements 60 to slide under top member 24 and engage the lower surface 70 of the top member 24 with the interior walls 66 of the engaging members 58 tightly abutting the edge or edges 68 of the top member 24, which will secure the thumb glove 10 to the thumbstick 12 of the video game controller 14. In an alternative embodiment, the attachment elements 60 are not utilized. Instead, the tight engagement of the engaging members 58 against the top member 24 of the thumbstick 12 is configured to be sufficient to securely hold the thumb glove 10 to the thumbstick 12 of the video game controller 14. As will be readily appreciated by persons skilled in the art, the thumb glove 10 of the present invention will secure the user's thumb 3 to the thumbstick 12 and substantially reduce, or even eliminate, the problem with the thumb 3 slipping off of the upper surface 26 of top member 24 of the thumbstick 12 during game play, even during rapid game play and/or when the user's thumb 3 is sweaty. This will allow faster and more precise strafing type of action and eliminate thumb creep. In addition, the thumb glove 10 of the present invention will significantly reduce thumb soreness and stress, common with use of the thumbstick 12 without the thumb glove 10, that could lead to repetitive type injuries. Use of the thumb glove 10 will also eliminate tension in the user's wrist while he or she is using the video game controller 14 to play a video game.

As will be readily appreciated by those skilled in the art, the various components of the thumb glove 10 of the present invention described above can be made out of a wide variety of materials. In one embodiment, the thumb sleeve 28 is made out of latex, rubber or like materials and the attachment mechanism 30 will be made out of a hard plastic or similar material. The upper surface 64 of the contact member 62 can be coated with latex or rubber to provide more comfort for the user. If desired, the edges of the contact member 62 can be curved slightly upward to hug the sides of the user's thumb for more comfortable and secure interaction between the contact member 62 and the user's thumb 3.

Figure 13:
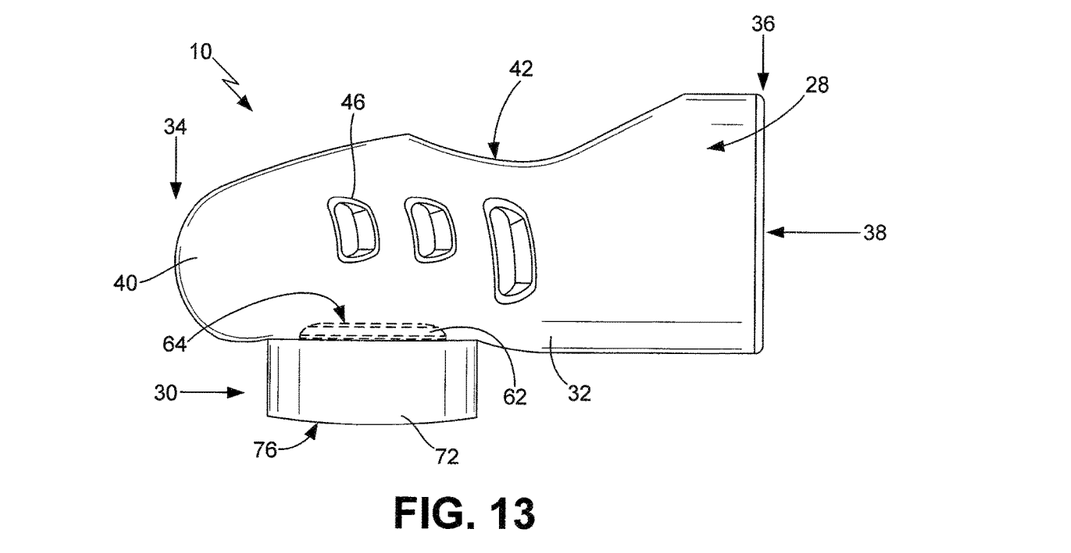
FIG. 13 is a right side view of a thumb glove that is configured according to a second embodiment of the present invention having an attachment mechanism that substantially envelopes around the thumbstick of the prior art video game controller of FIG. 1.
Figure 14:
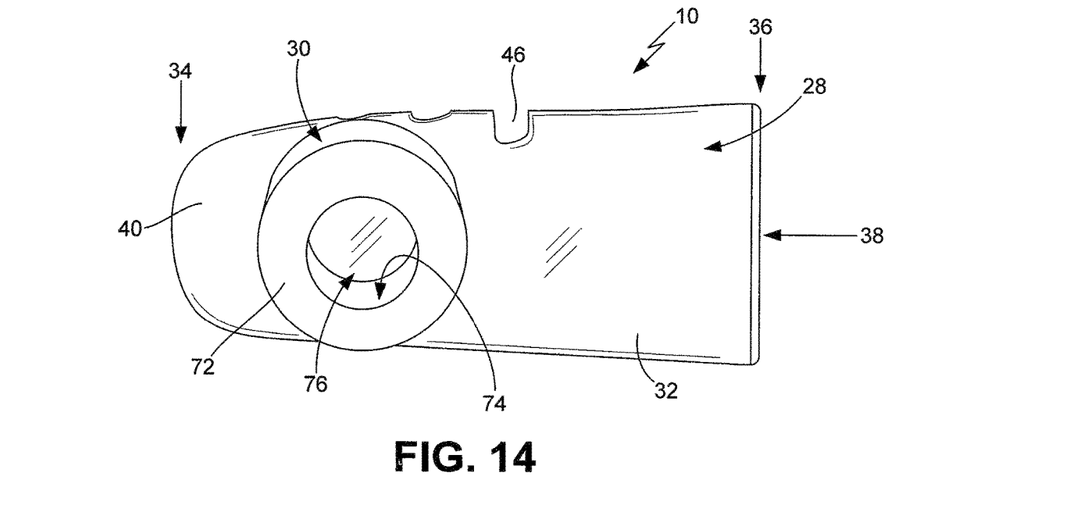
FIG. 14 is bottom perspective view of the thumb glove of FIG. 12.

A second embodiment, which is likely preferred due (primarily) to ease and cost of manufacturing, of the thumb glove 10 of the present invention is shown in FIGS. 13-14. In this embodiment, the attachment mechanism 30 comprises a tubular member 72 which is attached to or integral with the bottom wall 54 of the sleeve body 32 and extends downward (when being worn by the user 2) from the bottom wall 54 to tightly engage the top member 24 of the thumbstick 12. The tubular member 72 has interior side wall or walls 74 which form an opening 76 sized and configured to receive the top member 24 into the tubular member 72. When the attachment mechanism 30 is secured to the thumbstick 12, the interior wall or walls 74 of the tubular member 72 will tightly engage the edge 68 of the top member 24 to secure the tubular sleeve 28, and therefore the thumb glove 10, to the thumbstick 12 of the video game controller 14. To be effective, the tubular member 72 must be at least generally sized and configured in corresponding relation to the top member 24 of the thumbstick 12 to securely attach the tubular member 72 to the top member 24. In the embodiment shown in FIGS. 13-14, the interior diameter of the circular cross-sectioned tubular member 72 is configured to tightly go around the edge 68 of the round top member 24. Naturally, the shape of the tubular member 24 will have to be adapted for non-round top members 24. In a preferred embodiment of the present invention, the interior dimension of the tubular member 72 is selected so as to be slightly smaller than the width of the top member 24 and the tubular member 72 will be made out of materials that enable the tubular member 72 to expand around the edges 68 of the top member 24 and then retract to tightly engage the top member 24 to secure the thumb glove 10 to the thumb stick 12. This will allow the attachment mechanism 30 to fit different sized top members 24 for different video game controllers 14. The tight fit of the tubular member 72 around top member 24 of the thumbstick 12 has the benefit of reducing the likelihood of damage to the thumbstick 12 that could otherwise result from movement of the thumb glove 10 relative to the thumbstick 12.

In a preferred configuration of this embodiment of the thumb glove 10 of the present invention, the entire thumb glove 10 is made out of a pliable material and the attachment mechanism 30 is integral with the tubular sleeve 28. In one embodiment, the thumb glove 10 can be made out of a thermoplastic elastomer material or like polymers (including EDPM rubber, latex and the like). In one of the preferred embodiments, the entire thumb glove 10 is molded out of Santoprene™ (available from ExxonMobile). The use of Santoprene™ or like polymers provides a comfortable tubular sleeve 28 for the user's thumb 3 and provides the desired elasticity for the tubular member 72 of the attachment mechanism 30, as described above. Additionally, the use of a relatively soft, pliable material for the attachment mechanism 30 also reduces the likelihood of damaging the thumbstick 12 or any other components of the video game controller 14. In a preferred embodiment, the entire thumb glove 10, with the knuckle opening 42 and vent slots 46, is molded from the selected material. In a preferred configuration of this embodiment, the contact member 62 is also molded into the interior of the thumb cavity 38, as shown in FIG. 13, such that the bottom surface 4 of the user's thumb 3 will contact the upper surface 64 of contact member 62 (as described above for the previous embodiment) when the thumb 3 is inside the thumb cavity 38. This will provide the user 2 with a similar feel as if he or she is contacting the upper surface 26 of the thumbstick 12.

With regard to using the embodiment of FIGS. 13-14, before or after inserting his or her thumb 3 into the thumb cavity 38, the user 2 aligns the opening 76 of the tubular member 72 with edge 68 of the top member 24 and then presses the tubular member 72 downward onto the top member 24. Being pliable, the tubular member 72 will expand around the edge 68 of the top member 24 to allow the top member 24 through the opening 76 into the interior of the tubular member 72. The interior side wall 74 of the tubular member 74 will contract around the edge 68 of the top member 24 to tightly engage the top member 24 and, therefore, thumbstick 12. This will securely attach the tubular sleeve 28 to the thumbstick 12 of the video controller 14, thereby allowing the user 2 to maintain his or her thumb 3 in operative engagement with the thumbstick 12 so he or she will be able to control the objects of the video game even during rapid or aggressive game play and/or when his or her thumb 3 is sweaty.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A thumb glove for use with a video game controller having a thumbstick operated by a thumb of a user, said thumb glove comprising:

an elongated tubular sleeve having a sleeve body with a first end, a second end, a top wall, a bottom wall, a first side wall and a second side wall defining a thumb cavity in said sleeve body, said second end of said sleeve body being generally open so as to removably receive the thumb of the user in said thumb cavity, said thumb cavity sized and configured to receive at least a distal end and a knuckle of the thumb in said sleeve body when the user desires to operate the video game controller; and attachment means associated with said sleeve body of said tubular sleeve for attaching said tubular sleeve to the thumbstick of the video game controller, said attachment means structured and arranged so as to maintain the thumb of user in operative engagement with the thumbstick to allow the user to operate the video game controller.

2. The thumb glove of claim 1, wherein said sleeve body is sized and configured to substantially extend from the distal end of the thumb to at or near a proximal end of the thumb when the thumb of the user is disposed in said thumb cavity of said tubular sleeve.

3. The thumb glove of claim 1 further comprising one or more vent slots in at least one of said top wall, said bottom wall, said first side wall and said second side wall of said sleeve body, said vent slots sized and configured to allow air to pass into said thumb cavity when the user is using said thumb glove to operate the video game controller.

4. The thumb glove of claim 3, wherein said sleeve body has a plurality of said vent slots in each of said first side wall and said second side wall thereof.

5. The thumb glove of claim 1 further comprising a knuckle opening in said top wall of said sleeve body, said knuckle opening sized and configured to generally receive the knuckle of the thumb of the user therein when the thumb of the user is disposed in said thumb cavity of said tubular sleeve.

6. The thumb glove of claim 1, wherein said attachment means is attached to or integral with said bottom wall of said sleeve body and configured to extend generally downward from said sleeve body to the thumbstick of the video game controller when said tubular sleeve is attached to said thumbstick.

7. The thumb glove of claim 6, wherein said attachment means comprises a base having two or more downwardly extending engaging members, said base and said engaging members structured and arranged to engage a top member of the thumbstick so as to attach said thumb glove to the thumbstick.

8. The thumb glove of claim 7, wherein said engaging members are sized and configured to tightly engage an edge of the top member of the thumbstick so as to securely attach said thumb glove to the thumbstick.

9. The thumb glove of claim 7, wherein each of said engaging members have an inwardly directed attachment element that is sized and configured to engage a lower surface of the top member of the thumbstick below an edge of the top member so as to securely attach said thumb glove to the thumbstick.

10. The thumb glove of claim 6, wherein said attachment means comprises a tubular member that is attached to or integral with said bottom wall of said sleeve body, said tubular member having an opening size and configured to receive a top member of the thumbstick into said tubular member so an interior wall of said tubular member will tightly engage an edge of the top member to secure said thumb glove to the thumbstick.

11. The thumb glove of claim 10, wherein said tubular member is integral with said sleeve body and each of said tubular sleeve and said attachment means are made out of a pliable material.

12. The thumb glove of claim 1 further comprising a contact member having an upper surface that is disposed in said thumb cavity of said tubular sleeve, said contact member positioned so a bottom surface of the thumb of the user will be in contact with said upper surface thereof when user utilizes said thumb glove to operate the thumbstick of the video game controller.

13. The thumb glove of claim 12, wherein said contact member is associated with a base of said attachment means and positioned in said thumb cavity by extending upward from said base through a connector opening in said bottom wall of said sleeve body to attach said base to said tubular sleeve.

14. The thumb glove of claim 12, wherein said upper surface of said contact member is sized and configured to at least substantially correspond in shape and size to an upper surface of the top member of the thumbstick.

15. A thumb glove for use with a video game controller having a thumbstick operated by a thumb of a user, said thumb glove comprising:
  an elongated tubular sleeve having a sleeve body with a first end, a second end, a top wall, a bottom wall, a first side wall and a second side wall defining a thumb cavity in said sleeve body, said second end of said sleeve body being generally open so as to removably receive the thumb of the user in said thumb cavity, said sleeve body sized and configured to substantially extend from a distal end of the thumb to at or near a proximal end of the thumb when the thumb of the user is disposed in said thumb cavity of said tubular sleeve;
  a knuckle opening in said top wall of said sleeve body, said knuckle opening sized and configured to generally receive the knuckle of the thumb of the user therein when the thumb of the user is disposed in said thumb cavity of said tubular sleeve; and
  attachment means attached to or integral with said bottom wall of said sleeve body for attaching said tubular sleeve to the thumbstick of the video game controller, said attachment means configured to extend generally downward from said sleeve body to the thumbstick of the video game controller when said tubular sleeve is attached to said thumbstick, said attachment means structured and arranged so as to maintain the thumb of user in operative engagement with the thumbstick to allow the user to operate the video game controller.

16. The thumb glove of claim 15, wherein said attachment means comprises a base having two or more downwardly extending engaging members, said base and said engaging members structured and arranged to tightly engage a top member of the thumbstick so as to securely attach said thumb glove to the thumbstick.

17. The thumb glove of claim 15 further comprising a contact member having an upper surface that is disposed in said thumb cavity of said tubular sleeve, said contact member positioned so a bottom surface of the thumb of the user will be in contact with said upper surface thereof when user utilizes said thumb glove to operate the thumbstick of the video game controller, said upper surface of said contact member sized and configured so as to at least substantially correspond in shape and size to an upper surface of the top member of the thumbstick.

18. The thumb glove of claim 15, wherein each of said tubular sleeve and said attachment means are made out of a pliable material, said attachment means comprising a tubular member that is attached to or integral with said bottom wall of said sleeve body, said tubular member having an opening size and configured to receive a top member of the thumbstick into said tubular member so an interior wall of said tubular member will tightly engage an edge of the top member to secure said thumb glove to the thumbstick.

19. A thumb glove for use with a video game controller having a thumbstick operated by a thumb of a user, said thumb glove comprising:
  an elongated tubular sleeve having a sleeve body with a first end, a second end, a top wall, a bottom wall, a first side wall and a second side wall defining a thumb cavity in said sleeve body, said second end of said sleeve body being generally open so as to removably receive the thumb of the user in said thumb cavity, said sleeve body being sized and configured to allow the user to position a distal end of the thumb at or near said front wall of the sleeve body with said second end at or near a proximal end of the thumb when the thumb of the user is disposed in said thumb cavity of said tubular sleeve, said sleeve body made from a pliable material;
  a contact member having an upper surface that is disposed in said thumb cavity of said tubular sleeve, said contact member positioned so a bottom surface of the thumb of the user will be in contact with said upper surface thereof when user utilizes said thumb glove to operate the thumbstick of the video game controller; and
  attachment means attached to or integral with said bottom wall of said sleeve body for attaching said tubular sleeve to the thumbstick of the video game controller, said attachment means configured to extend generally downward from said sleeve body to the thumbstick of the video game controller when said tubular sleeve is attached to said thumbstick, said attachment means structured and arranged so as to maintain the thumb of user in operative engagement with the thumbstick to allow the user to operate the video game controller.

20. The thumb glove of claim 19 further comprising one or more vent slots in at least one of said top wall, said bottom wall, said first side wall and said second side wall of said sleeve body and a knuckle opening in said top wall of said sleeve body, said vent slots sized and configured to allow air to pass into said thumb cavity so as to cool the thumb of the user while using said thumb glove to operate the video game controller, said knuckle opening sized and configured to generally receive the knuckle of the thumb of the user therein when the thumb of the user is disposed in said thumb cavity of said tubular sleeve.

* * * * *